United States Patent [19]

Föhl

[11] Patent Number: 4,529,144
[45] Date of Patent: Jul. 16, 1985

[54] AUTOMATICALLY LOCKING BELT ROLL-UP DEVICE FOR SAFETY BELTS, ESPECIALLY FOR MOTOR VEHICLES

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 494,696

[22] Filed: May 16, 1983

[30] Foreign Application Priority Data

May 17, 1982 [DE] Fed. Rep. of Germany ....... 3218569

[51] Int. Cl.³ ...................... A62B 35/00; B65H 75/48
[52] U.S. Cl. ............................................. 242/107.4 E
[58] Field of Search ............... 242/107.4 E, 107.4 R; 280/806, 807, 808, 803; 297/475–480

[56] References Cited

U.S. PATENT DOCUMENTS

| 3,193,327 | 7/1965 | Roe | 242/107.4 E |
|---|---|---|---|
| 3,286,946 | 11/1966 | Board et al. | 242/107.4 E X |
| 3,343,764 | 9/1967 | Webb, Jr. | 242/107.4 E |
| 3,603,525 | 9/1971 | Pringle | 242/107.4 E X |
| 3,632,057 | 1/1972 | Pringle | 242/107.4 E |
| 3,635,419 | 1/1972 | Pringle | 242/107.4 E |
| 3,724,773 | 4/1973 | Fisher | 242/107.4 E X |
| 3,858,825 | 1/1975 | Weman | 242/107.4 E X |

FOREIGN PATENT DOCUMENTS

1249704  9/1967 Fed. Rep. of Germany .
1431257 10/1972 Fed. Rep. of Germany .

*Primary Examiner*—John M. Jillions
*Attorney, Agent, or Firm*—Yount & Tarolli

[57] ABSTRACT

Automatically locking belt roll-up device for safety belts, especially for motor vehicles, with a belt shaft which is rotatably supported in a roll-up device housing. The belt shaft has ratchet teeth and is under the action of a rewinding spring. A spring-loaded pawl is automatically locked with the ratchet teeth by force of the spring after the belt is put on. The pawl is additionally under the action of a delay device, which is released only after a predetermined time phase for effecting the locking process.

11 Claims, 20 Drawing Figures

AUTOMATICALLY LOCKING BELT ROLL-UP DEVICE FOR SAFETY BELTS, ESPECIALLY FOR MOTOR VEHICLES

BACKGROUND OF THE INVENTION

1. Field of the Invention

The invention relates to an automatically locking belt roll-up device for safety belts, especially for motor vehicles, having a belt shaft rotatably supported in a roll-up device housing, a rewinding spring connected to the belt shaft, ratchet teeth fixedly attached to the belt shaft, and a spring-loaded pawl which automatically locks with the ratchet teeth by the force of the spring after the belt is put on.

2. Description of the Prior Art

In known designs of this type (German Published Prosecuted Applications DE-AS No. 12 49 704 and DE-AS No. 14 31 257), a belt shaft is supported in bearings in a strong roll-up device housing and can turn, for unwinding a belt fastened on the belt shaft, against the force of a rewind spring. Locking discs with ratchet teeth which cooperate with a pawl are arranged on both sides of the belt winding. Functionally connected to the belt shaft is a cam which can rotate a predetermined angle and which can be moved into one position for unwinding and into the other position for rewinding. The pawl is pushed in the direction of the belt winding by a spring. If the belt is wound up completely, the pawl is pushed outward through contact with the outer belt layer, i.e., away from the ratchet teeth. While the pawl could drop into the ratchet teeth after a predetermined length of the belt is unwound, it is initially held outside the locking position by the adjusted cam, so that putting-on the belt is not inhibited. The cam is reset only after brief rewinding of the applied belt and then the pawl drops into the ratchet teeth under the force of the spring, so that further unwinding of the belt is no longer possible. It is a disadvantage of this known design that interference with putting on the belt occurs if the belt pullout is stopped or the belt is run backward briefly, because as explained immediately above, the belt shaft is brought into the locking position. Pulling the belt out further, which is necessary for putting the belt on completely, is possible only if the belt is rewound completely, so that the roll-up device is again in its starting position, i.e., the cam again holds the pawl away from the ratchet teeth.

SUMMARY OF THE INVENTION

It is an object of the invention to provide a belt roll-up device of the type mentioned that will during the putting on process permit further uninhibited unwind motion of the belt even in the event of a brief stoppage or slight pulling back of the belt With the foregoing and other objects in view, there is provided in accordance with the invention an automatically locking belt roll-up device for safety belts, especially for motor vehicles, in which upon pulling out the belt to put the belt on an occupant, locking of the belt shaft immediately occurs, comprising a roll-up device housing, a belt shaft rotatably supported in the housing, a safety belt rolled around the belt shaft, a rewinding spring connected to the belt shaft and urging the belt shaft to rotate to roll-up the safety belt, ratchet teeth fixedly attached to the belt shaft, a spring-loaded pawl urged toward the ratchet teeth when the belt is pulled out to put the belt on the occupant, said pawl automatically engaging the ratchet teeth and locking the belt shaft if the belt pullout is stopped or run back briefly, the combination therewith of a delay device connected to the pawl which delays said automatic engagement of the pawl with the ratchet teeth for a predetermined time to allow the occupant time to complete putting on the belt even if during pullout, the belt is stopped or run back briefly.

Other features which are considered as characteristic for the invention are set forth in the appended claims.

Although the invention is illustrated and described herein as embodied in an automatically locking belt roll-up device for safety belts, especially for motor vehicles, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with, the accompanying drawings, in which.

DETAILED DESCRIPTION OF THE INVENTION

In accordance with the invention the pawl is additionally under the action of a delay device by which the pawl is released only after a predetermined time phase for effecting the locking process.

In the wound-up position, i.e., if the belt winding is complete or nearly complete, the pawl or the delay device is pushed via the outside circumference of the belt winding so far out of engagement with the ratchet teeth that it has a predetermined safety margin from the teeth of the ratchet wheel. The time phase determined by the delay device is set so that the vehicle passenger has sufficient time to correctly put on the safety belt. After this predetermined time phase, the pawl is released, whereupon it immediately drops into the ratchet teeth and the safety belt is secured against further undesired pull-out.

According to a first embodiment of the invention, a pressure-agent brake, and preferably a pneumatic braking device, is employed as the delay device. A simple design is obtained if a cylinder/piston device is used, where a position of the piston in the cylinder is chosen such that the piston, in a first phase of the stroke, can be moved slowly with predetermined damping or delay in the cylinder by the force of the spring acting on the pawl (delay phase) and, after this damped stroke is traversed, the damping in the form of the compressed air cushion is canceled by the provision that in this stroke position, the cylinder space is connected to the outside air via suitable openings in the cylinder and/or piston, and pressure equalization takes place in the process. Thereafter, the piston can traverse the last part of the stroke uninhibited and undamped, so that the pawl can drop unimpeded into the ratchet teeth. If the belt is taken off again, i.e., the belt is rewound, the pawl is taken out of engagement with the ratchet teeth again via the belt winding and the piston is reset to the starting position.

According to alternative embodiments, the delay device can also be designed as a friction brake or a magnetic brake.

A particularly advantageous embodiment of the invention is obtained if the delay device is formed by an inertial mass which is coupled to the pawl via a step-up gear and is driven by the latter. To this end, the pawl or a rack, of which the number of teeth is matched to the delay time phase, is in connection with the inertial mass during the delay phase, where the velocity, starting from zero, increases slowly during the motion phase to be damped due to the inertia of the inertial mass. After the above-mentioned phase is traversed, the pawl is separated from the above-mentioned gearing, so that the pawl can again drop unimpeded into the ratchet teeth.

Further advantageous details can be seen from the embodiment examples which are shown in the drawings and will be described in the following.

Figure 1:
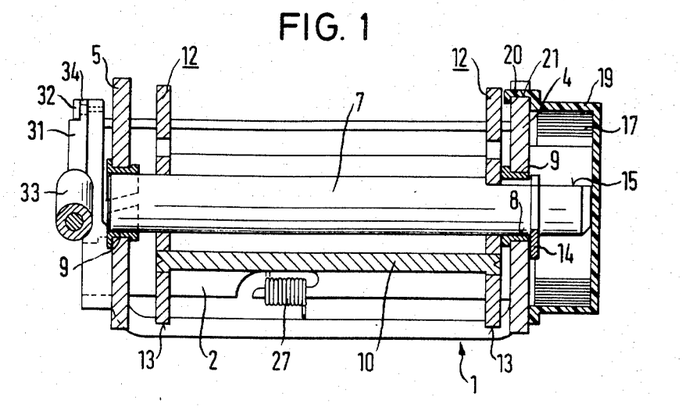
FIGS. 1 and 2 show the belt roll-up device according to the invention in a cross-sectional view and a top view.
Figure 2:
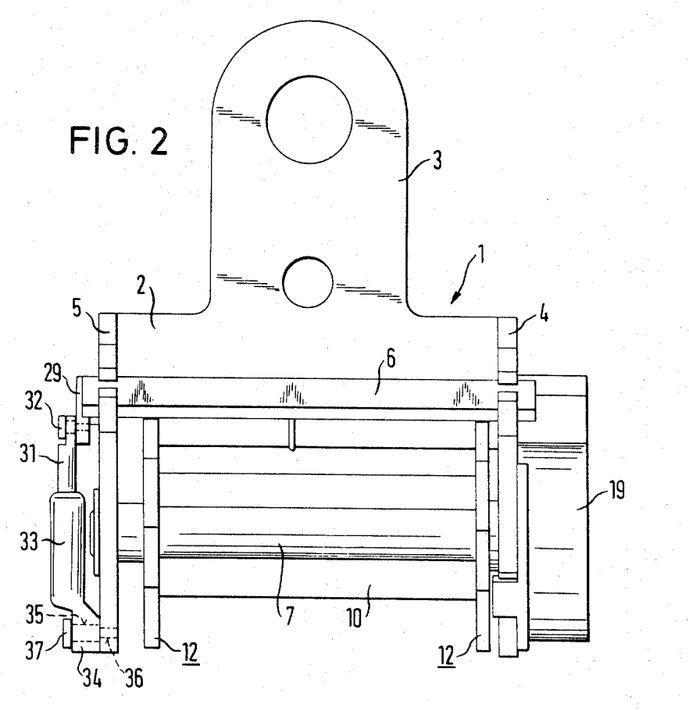
Figure 3:
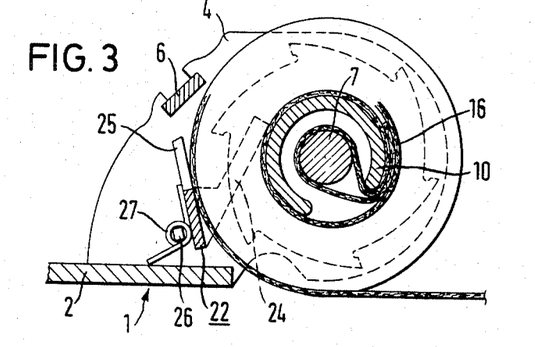
FIGS. 3 and 4 show cross-sectional views of the belt roll-up device according to FIGS. 1 and 2 with two different wind-up positions of the belt and positions of the pawl.
Figure 4:
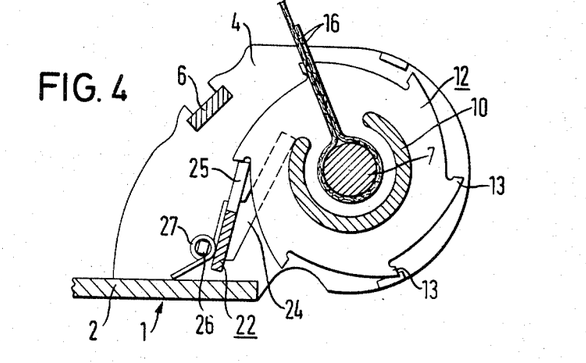
Figure 5:
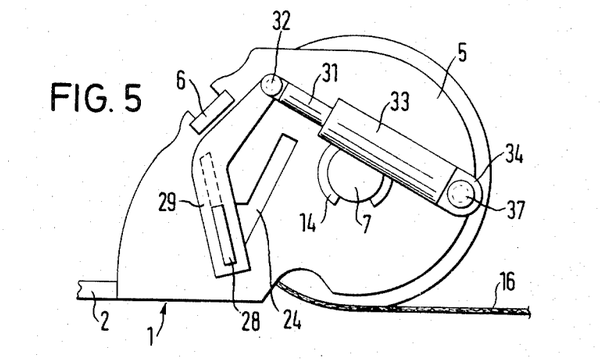
FIG. 5 shows a side view of the belt roll-up device according to the invention as per the preceding figures.
Figure 6:
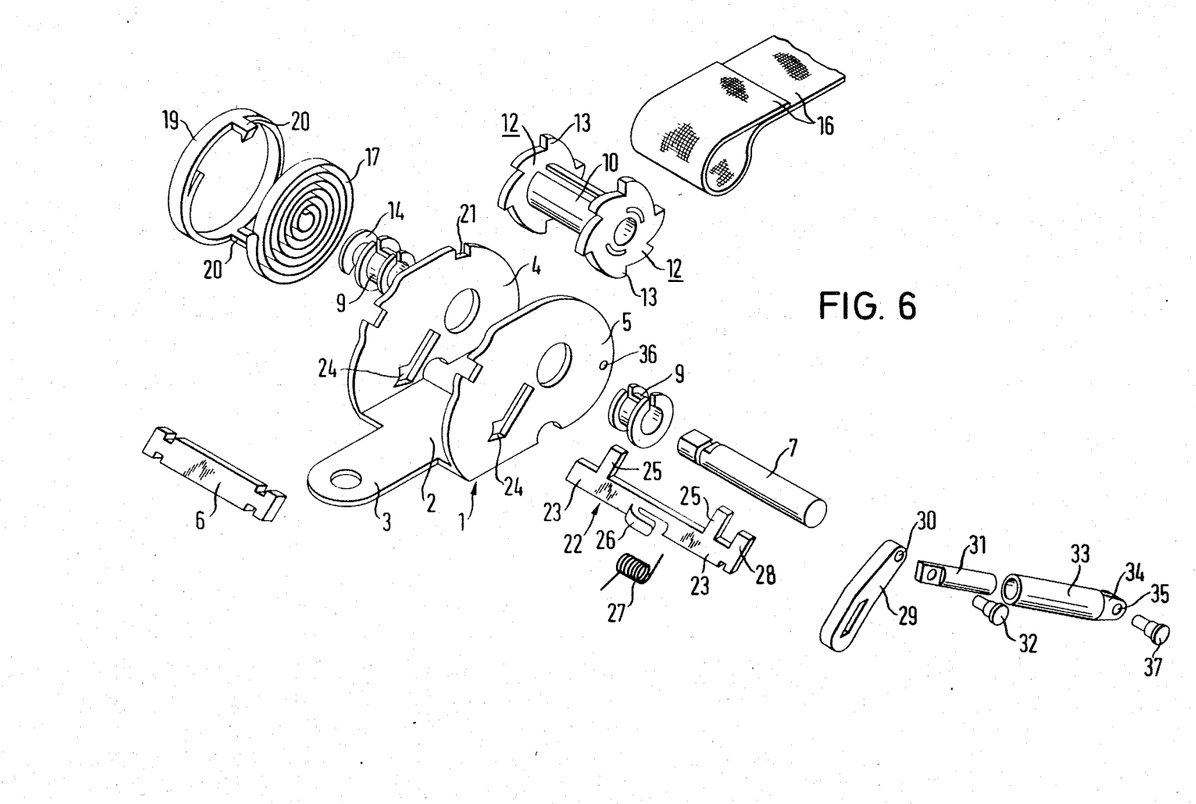
FIG. 6 shows the belt roll-up device according to the preceding figures in an exploded view.
Figure 7:
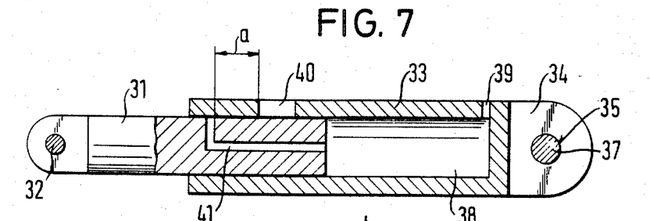
FIGS. 7-10 show the delay device of the belt roll-up device designed as a cylinder/piston device according to the preceding figures as a detail in an enlarged view.
Figure 8:
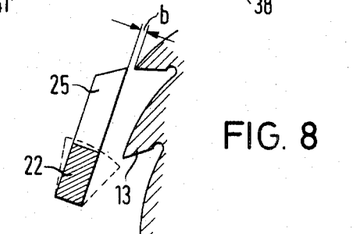

The basic design of the automatically locking belt roll-up device for safety belts is shown with the aid of FIGS. 1-4. Here, the belt roll-up device has as the supporting part a roll-up housing 1 with a base plate 2 having a mounting extension 3 as well as two bent-off side plates 4 and 5. A connecting strap 6 extends across and aids in stiffening the bent-off side plates 4 and 5. Bearings 9 arranged in bearing holes 8 support a freely rotatably belt shaft 7. The belt shaft 7 serves as a pivot bearing of a belt reel 10 which consists of a rolled-up sleeve, at the opposite ends of which ratchet wheels 12 with sawtooth-shaped ratchet teeth 13 are rigidly fastened. The belt shaft 7 which is provided with a flat surface 15 at one end is secured axially by a securing ring 14. To the belt reel 10 is locked in known manner a belt 16 which can be wound completely on the belt reel 10. On the side of the belt shaft 7 having the flat surface 15 a rewinding spring 17 outside side plate 4 is locked on the flat surface, secured against rotation. The other end of rewinding spring 17 is fastened to the spring housing 19. As is shown particularly in the exploded view of FIG. 6, the spring housing 19, which is realized as a formed part and preferably as a rotational part, has at two different points of the spring housing circumference at least two spring catches 20 by which the spring housing 19 can be snapped onto the side plate 4, the side plate 4 having for this purpose recesses 21 concentric to the axis of the belt shaft. In this manner, the spring housing 19 is fastened concentrically to the belt shaft axis and is easy to assemble. Pawl 22 is a simple stamped part which is mounted in the side plates 4 and 5 of the roll-up housing 1. The opposite ends 23 of pawl 22 are in substantially X-shaped bearing openings 24 in the side plates 4 and 5, in which the pawl can be swung a predetermined angle. The pawl has two pawl extensions 25 which are at the height of the associated ratchet wheels 12 and at the same time serve to axially secure the pawl 22 within the side plates 4 and 5. Approximately in the middle of the pawl 22 is a sheared-out tab 26, into which one spring leg of a spring 27 is hung. The spring is braced with its other spring leg against the roll-up device housing 1, as may clearly be seen in FIGS. 3 and 4. The force of this spring 27 pushes the pawl 22 with a predetermined pressure inward, i.e., toward the belt shaft 7 and toward the ratchet teeth 13. After the belt 16 is wound up completely, the full belt winding pushes the pawl with its outer surface radially outward such that the two pawl extensions 25 are a predetermined distance from the ratchet teeth 13 of the ratchet wheel 12. On the side opposite the rewind spring 17 of the roll-up housing, the pawl 22 extends beyond the side plate 5. The protruding part 28 of pawl is fastened to a one-arm lever 29 and operates to rotate the lever. The lever 29 has at its free end a hole 30, at which the delay device explained in the following engages.

Figure 9:
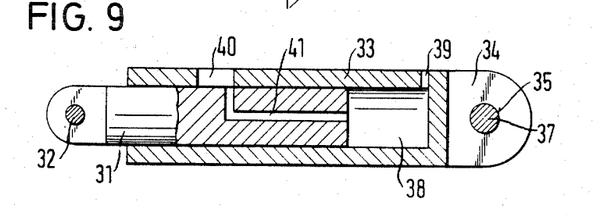
Figure 10:
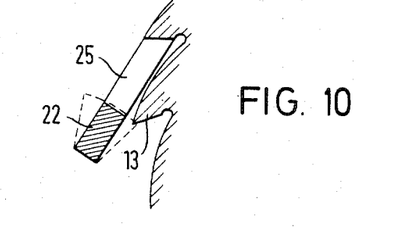
Figure 11:
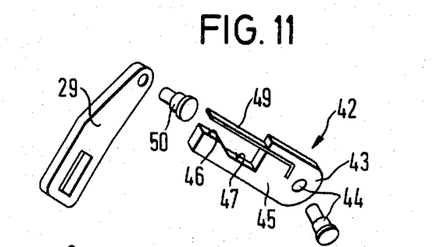
FIGS. 11-15 show another embodiment of the delay device for the belt roll-up device according to the invention, designed as a friction brake.
Figure 12:
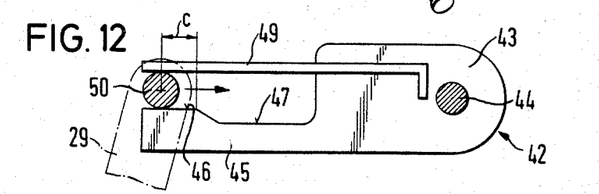
Figure 13:
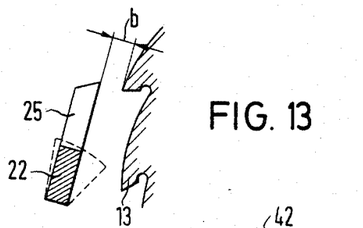

In the embodiment example according to FIGS. 1-10, the delay is provided as a pneumatic braking device, consisting of a piston 31 which is flattened at one end for fastening to the hole 30 of the lever 29 by means of a pin 32. The delay device consists further of a cylinder 33 which is provided near the bottom with a flange 34 which has a hole 35 for fastening it movably to a hole 36 of the side plate 5 by means of a pin 37. The cylinder/piston device is illustrated in further detail in FIGS. 7-10. Motion of the piston 31 in the cylinder bore 38, which is uniform and damped to a predetermined degree, is made possible by a suitable clearance fit between the outer surface of the piston 31 and the inside surface of the cylinder 33, or by arranging a small hole 39 at the engaged end of the cylinder bore 38, through which the air can escape in a dosed manner if the piston 31 is pushed-in by the force of the spring 27. The cylinder 33 has an opening 40 in the cylinder wall, while the piston 31 has a connecting hole 41 consisting of an axial and a radial section. After the start of the belt-pullout in the putting-on process, the piston 31 is moved by the force of the spring 27 relative to the cylinder 33, where after a predetermined stroke a which determines the delay time phase, the connecting hole 41 comes into alignment with the opening 40, whereby the pressure in the cylinder bore is equalized and a delay or damping of the piston and therefore, of the pawl 22 is no longer provided. Thereby the spring 27 pushes the pawl extensions 25 of the pawl immediately into the ratchet teeth of the ratchet wheels 12, connected with a locking of the belt system. The distances explained are matched here so that at the end of the damping stroke or the damping distance a, the pawl extensions 25 still have a small distance b from the ratchet teeth 13, according to FIG. 8. This ensures that premature locking does not occur. FIG. 9 shows the undamped position of the delay device, in which the cylinder space in the cylinder bore 38 is decompressed, i.e., is connected to the outside air, whereby the pawl 22 is released to move into the ratchet teeth according to FIG. 10. By the described system, an exact pulling-out time for putting-on a belt can be predetermined, within which time the locking device remains passive. The damped stroke a determines the time phase, within which a detent of the pawl with the ratchet teeth does not occur. Only after the damped stroke a is the pawl released for engagement with the ratchet teeth.

Figures 14, 15:
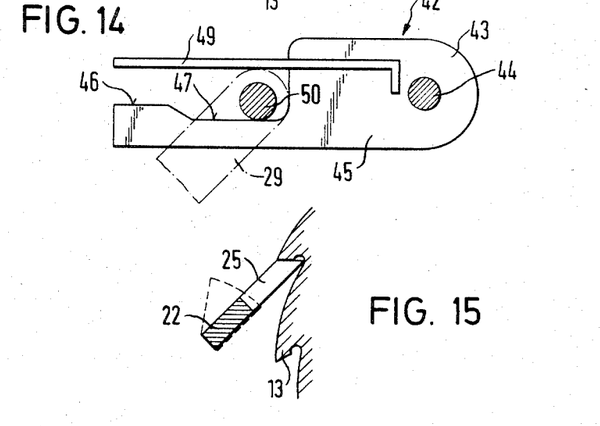

In the embodiment example according to FIGS. 11–16, the delay device is designed as a friction brake. As indicated in the exploded view according to FIG. 11, here too, a one-arm lever 29 is provided which is firmly connected to the pawl 22 in the manner described. In the roll-up device housing, for instance there is a one-arm profiled lever 42 pivoted at the side plate 5. Lever 42 has a bearing extension 43 with a fulcrum 44 as well as a tapered extension 45. The last-mentioned extension 45 has a friction track 46 and a slide track 47 which is parallel thereto and is set back in step-fashion. Parallel to the mentioned tracks there is a spring 49 which is fastened on one side in the bearing extensions 43. The lever 29 has a pin-like sliding element 50 which, in the starting position of the delay device, i.e., in the disengaged position of the pawl 22, is pushed by the spring 49 with a predetermined force against the friction track 46. As the belt rolls off, the spring 27 pushes the pawl 22, the lever 29 and the sliding element 50 in the direction of the arrow according to FIG. 12, whereupon, after traversing the friction track 46, the sliding element 50 leaves the friction track 46 according to the dimension c and gets to the lower slide track 47, in which position of the sliding element the spring 49 is ineffective. After traversing the distance c, the spring damping or delay is canceled and the pawl extensions 25 of the pawl 22 is pushed by the force of the spring 27 unimpeded into the ratchet teeth 13, as shown in FIG. 15. According to the above-described embodiment example, a small spacing b exists between the pawl 22 and the ratchet teeth 13 after the friction track 46 is traversed.

Figures 16, 17, 18:
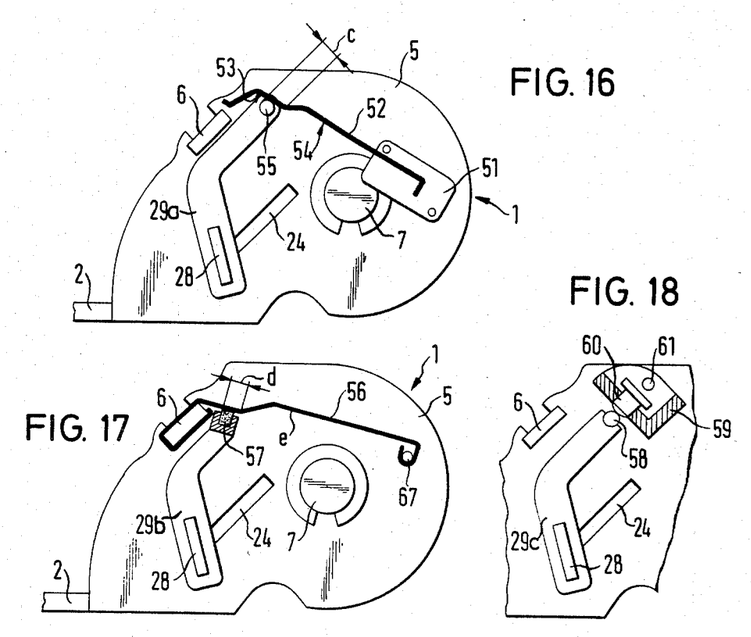
FIG. 16 shows a further delay device based on the friction principle, for the belt roll-up device according to the invention.
FIGS. 17 and 18 show two further schematically shown embodiment examples of delay devices for the belt roll-up device according to the invention, which are designed as magnetic brakes.

In the embodiment example according to FIG. 16, a support block 51 is fixedly mounted on the side plate 5 of the roll-up device housing 1. Clamped to the support block 51 is an elongated spring 52 which has, in agreement with the embodiment example according to FIG. 11, a friction track 53 with a length c, and a slide track 54. A sliding element 55 which causes during the belt-tightening phase a damped or delayed motion of the pawl in the direction to the ratchet teeth is again supported at the free end of the lever 29a. In order to ensure in the embodiment example according to FIG. 16 that after the delay phase, the motion of the pawl or the slide element 55 is no longer impeded, a stop is provided for the spring 52 which is formed by the connecting strap 6 of the roll-up device housing 1. In the embodiment examples according to FIGS. 17 and 18, the delay of the pawl 22 and the lever firmly connected thereto is brought about, at least largely, by magnetic force. In the embodiment example according to FIG. 17, an elongated ferromagnetic band 56 is provide which is supported, slightly movably, on the one end, for instance, by means of a pin 67 at the side plate 5 of the roll-up device housing 1 and on the other end, at the connecting strap 6. The band 56 is shaped, substantially in agreement with FIG. 16, i.e. in step-fashion and has a delay section d and a release section e which is offset therefrom in step-fashion. At the free end of the lever 29b, a permanent magnet 57 is firmly arranged which makes contact with the band in the starting position at the beginning of the delay section d. After the belt is unwound, i.e., when the spring force of 27 becomes effective, the permanent magnet 57 slides with a predetermined friction force and with a predetermined magnetic holding force along the delay section d, i.e., the corresponding band section. In the region of the release section e, i.e., in the region of the off-set second band section, the friction force and at least a major part of the magnetic holding force is eliminated, and the lever 29b is no longer impeded.

In the embodiment example according the FIG. 18, there is arranged at the free end of the lever 29c a sliding element 58 in the form of a sphere or a cylinder, which is braced in the starting position against a permanent magnet 60 in contact therewith at a support element 59 which is fixed to the housing. The motion of the pin-like permanent magnet 60 is limited by a stop 61. The lever 29c is held in the starting position with a predetermined magnetic force via the metallic sliding element.

Figure 19:
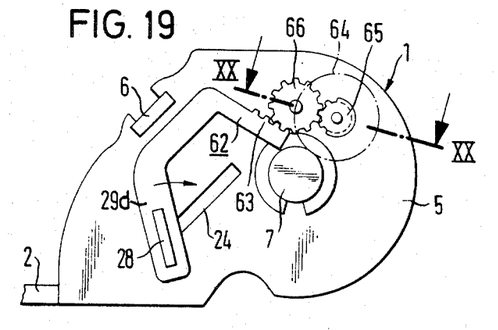
FIGS. 19 and 20 show an embodiment of a delay device in a side view and a cross-sectional view, which is based on the inertial-mass principle.
Figure 20:
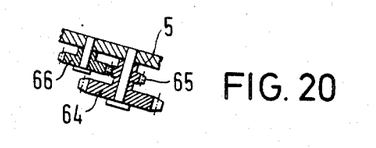

In the embodiment example according to FIGS. 19 and 20, a lever 29d is again firmly connected to the pawl. The lever 29d has an arc-shaped extension 62 which is designed as a rack 63 in the end section. Rotatably supported at the side plate 5 of the housing of the roll-up device 1 is a disc-shaped inertial mass 64 with a pinion 65 as well as a gear 66 which meshes with the pinion 65 as well as with the rack 63 in the starting position. The rack 63, the gear 66 and the pinion 65 represent a step-up transmission. After the belt is unwound, the lever 29 is again moved in the direction of the arrow according to FIG. 19 by the spring 27, this motion being delayed by the inertial mass 64 which tends to remain in the starting position. The force of the spring 27 is transmitted via the reduction gear to the inertial mass 64 which slowly starts to rotate. Only after the gear 66 has left the rack 63 is the coupling between the pawl and the inertial mass 64 released and the pawl is released for moving into the locked position. By rolling up the belt, the lever 29d and the rack are moved back again into the starting position in which coupling between the rack 63 and the inertial mass 64 exists again.

I claim:

1. An automatically locking belt roll-up device for safety belts, especially for motor vehicles, in which upon pulling out the belt to put the belt on an occupant, locking of the belt shaft immediately occurs, comprising a roll-up device housing, a belt shaft rotatably supported in the housing, a safety belt rolled around the belt shaft, a rewinding spring connected to the belt shaft and urging the belt shaft to rotate to roll up the safety belt, ratchet teeth fixedly attached to the belt shaft, a spring-loaded pawl urged toward the ratchet teeth when the belt is pulled out to put the belt on the occupant, said pawl automatically engaging the ratchet teeth and locking the belt shaft if the belt pull out is stopped or run back briefly, the combination therewith of a delay device connected to the pawl which delays said automatic engagement of the pawl with the ratchet teeth for a predetermined time to allow the occupant time to complete putting on the belt even if during pull out, the belt is stopped or run back briefly, said delay device includes an inertial mass and reduction gearing connecting said inertial mass with said pawl.

2. Belt roll-up device according to claim 1 wherein said reduction gearing includes a rack and a pinion, said rack being connected with said pawl and designed in accordance with the predetermined delay time phase, said pinion being connected with the inertial mass.

3. Belt roll-up device according to claim 1 and further including reset means for resetting the pawl and the delay device to a starting condition by engagement with the outside circumference of the belt rolled up on the belt shaft.

4. A safety belt retractor assembly which allows for slight retraction of the safety belt during movement of the safety belt from a retracted condition to an extended condition, said retractor asembly comprising a rotatable reel around which the safety belt is wound when the safety belt is in the retracted condition, a ratchet wheel connected with said reel for rotation therewith upon unwinding of the safety belt from said reel, a pawl movable between an engaged position engaging the ratchet wheel to block rotation of the ratchet wheel in an unwinding direction and a disengaged position in which said pawl is ineffective to block rotation of the ratchet wheel in the unwinding direction, biasing means for moving said pawl from the disengaged position to the engaged position upon unwinding of the safety belt, and delay means for delaying movement of said pawl from the disengaged position to the engaged position upon unwinding of the safety belt to accommodate delays and sight retractions of the safety belt during unwinding of the safety belt, said delay means including a movable mass and means for connecting said mass and said pawl with said biasing means so that said biasing means moves both said mass and said pawl against the influence of the inertia of said mass upon unwinding of the safety belt to enable the inertia of said mass to delay movement of said pawl from the disengaged position to the engaged position.

5. A retractor assembly as set forth in claim 4 further including means for supporting said reel for rotation about a first axis, means for supporting said mass for rotation about a second axis, and means for supporting said pawl for pivotal movement about a third axis, said means for connecting said mass and pawl with said biasing means including drive means for rotating said mass about said second axis during pivotal movement of said pawl about said third axis.

6. A retractor assembly as set forth in claim 5 wherein said drive means includes a rack gear connected with said pawl for movement therewith and a pinion gear drivingly connected with said mass, said rack gear being movable with said pawl to rotate said pinion gear and mass during pivotal movement of said pawl.

7. A retractor assembly as set forth in claim 4 wherein said means for connecting said mass and said pawl with said biasing means is effective to transmit drive forces from said biasing means to said mas to move said mass during an initial portion of the movement of said pawl from the disengaged position to the engaged position and is ineffective to transmit drive forces from said biasing means to said mass during a final portion of the movement of said pawl from the disengaged position to the engaged position.

8. A retractor assembly as set forth in claim 7 wherein said means for connecting said mass and said pawl with said biasing means includes a pair of gears, said gears being disposed in meshing engagement during the initial portion of the movement of said pawl from the disengaged position to the engaged position and being out of meshing engagement during the final portion of the movement of said pawl from the disengaged position to the engaged position.

9. A retractor assembly as set forth in claim 8 wherein said pair of gears includes a rack fixedly connected with said pawl for movement therewith and a pinion drivingly connected with said mass, said rack having teeth which are disposed in meshing engagement with teeth on said pinion during the initial portion of the movement of said pawl from the disengaged position, said rack teeth being out of meshing engagement with said pinion teeth during the final portion of the movement of said pawl from the disengaged position.

10. A retractor assembly as set forth in claim 4 wherein said means for connecting said mass and pawl with said biasing means includes a first gear fixedly connected with said pawl for movement therewith and a second gear drivingly connected with said mass.

11. A retractor assembly as set forth in claim 10 wherein said first gear is a rack and said second gear is a pinion.

* * * * *